Sept. 6, 1938. O. SAUER 2,129,385
KNITTING
Filed July 8, 1935 8 Sheets-Sheet 1
FIG. I.
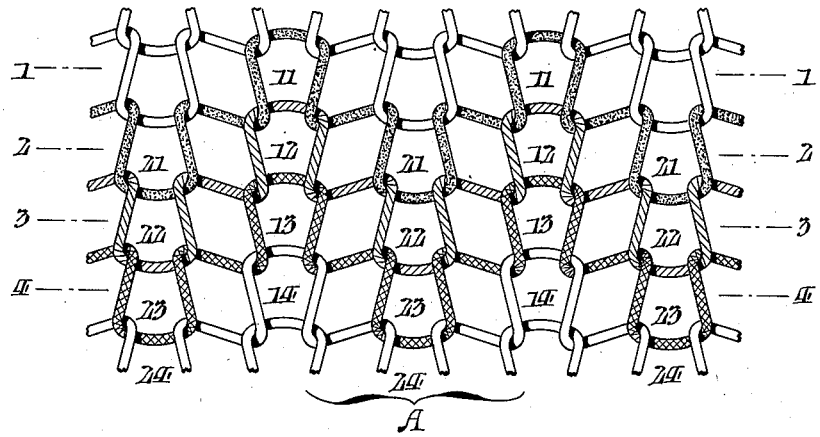
FIG. II.
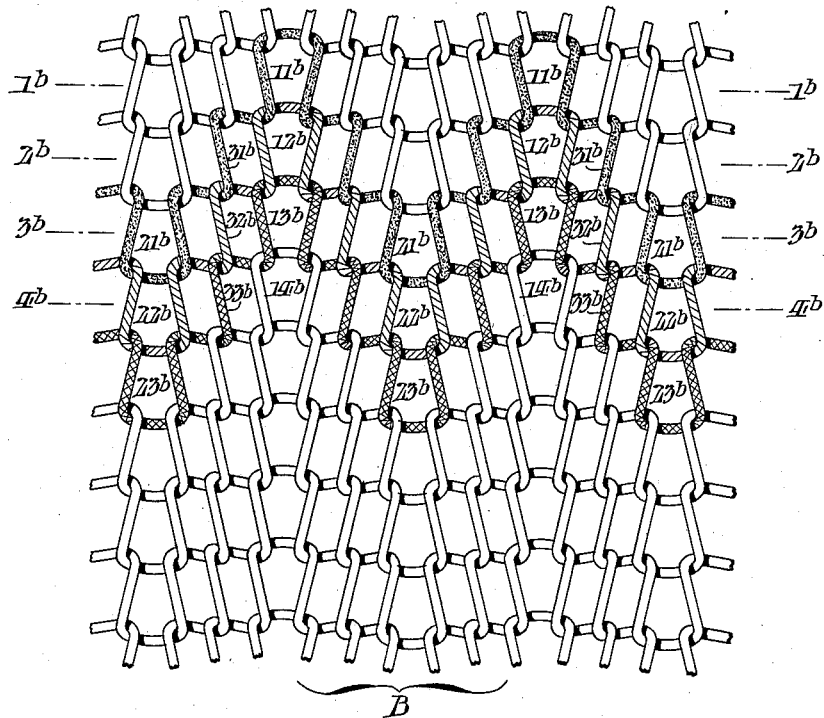
INVENTOR:
Oskar Sauer Sept. 6, 1938.     O. SAUER     2,129,385
KNITTING
Filed July 8, 1935     8 Sheets-Sheet 2
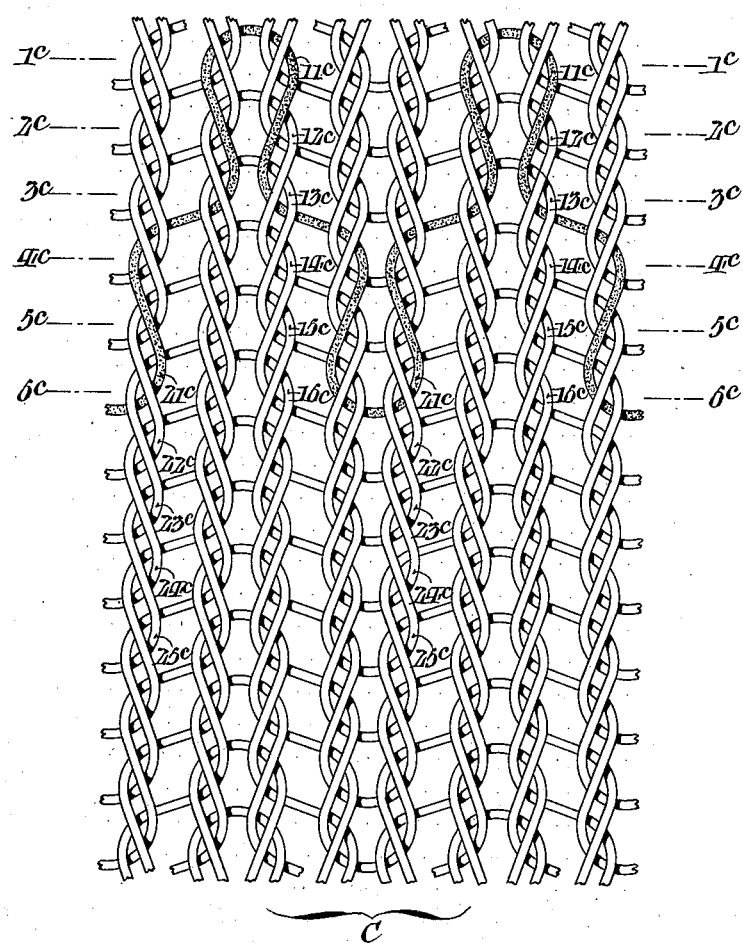
FIG. III.

FIG. IV.
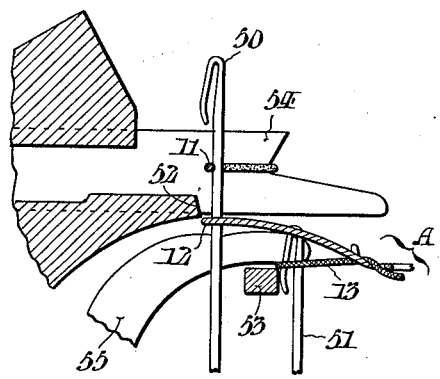
FIG. V.
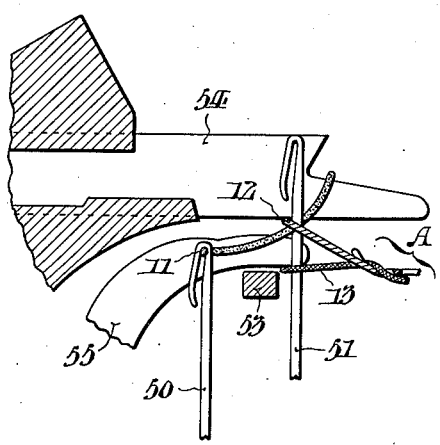
FIG. VI.
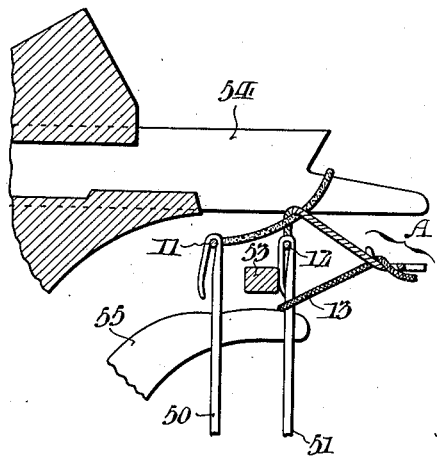
FIG. VII.
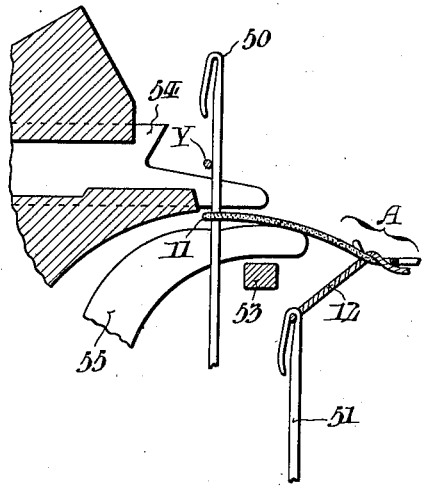
WITNESSES:
John C. Bergner
John A. Weidler
INVENTOR:
Oskar Sauer,
BY Fraley Paul
ATTORNEYS.

Sept. 6, 1938.    O. SAUER    2,129,385
KNITTING
Filed July 8, 1935    8 Sheets-Sheet 4
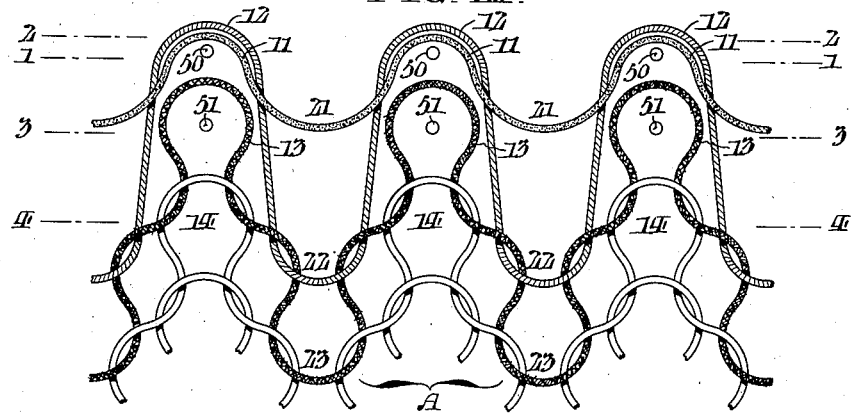
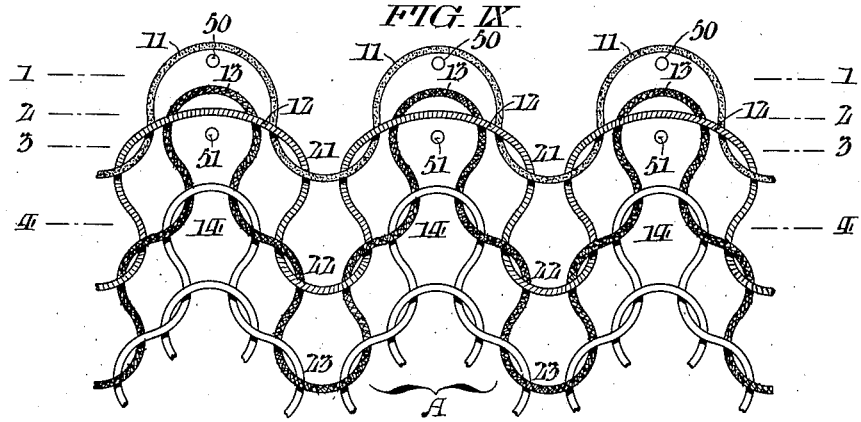
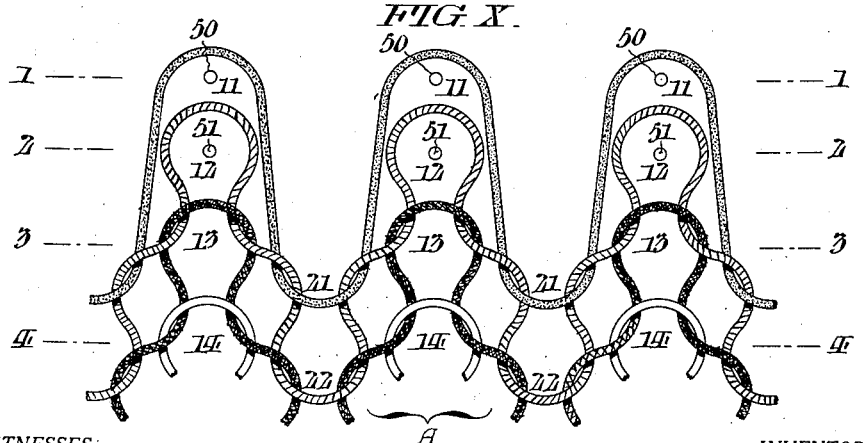

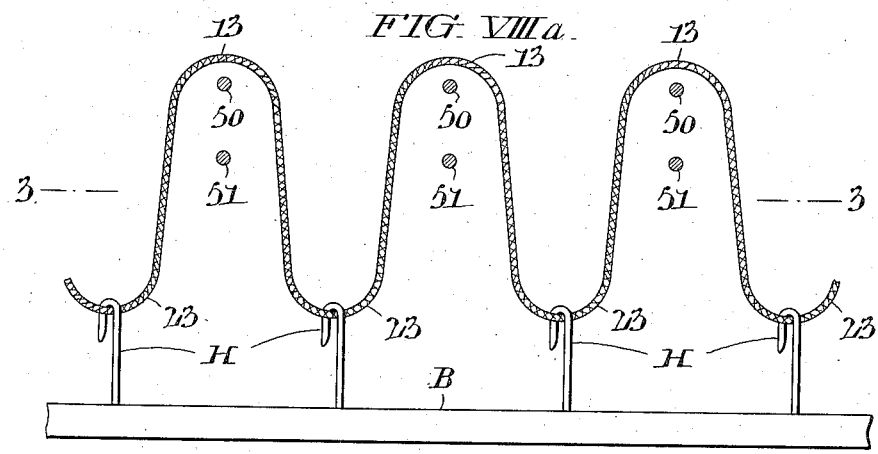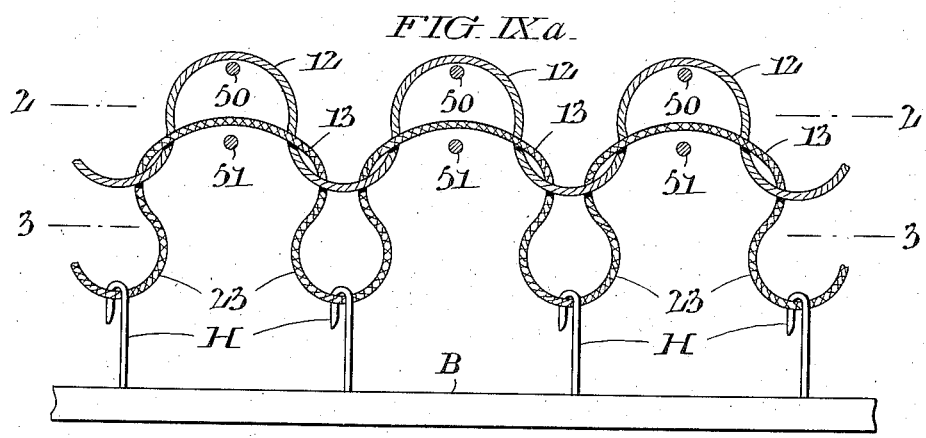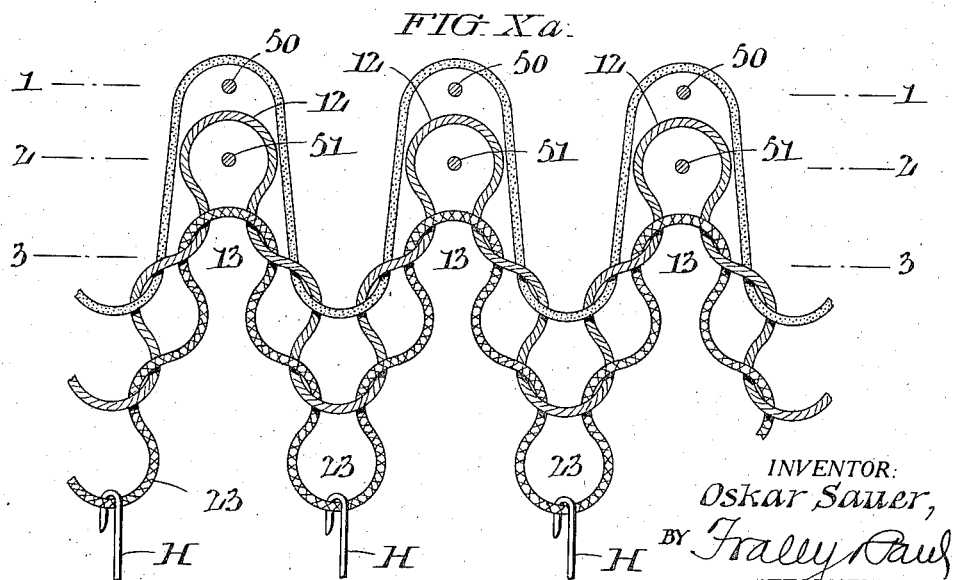

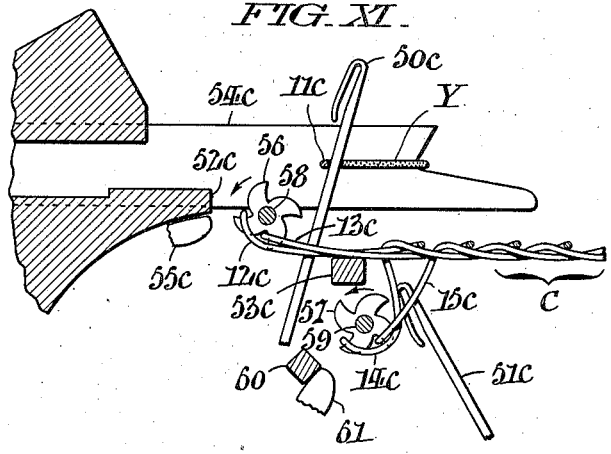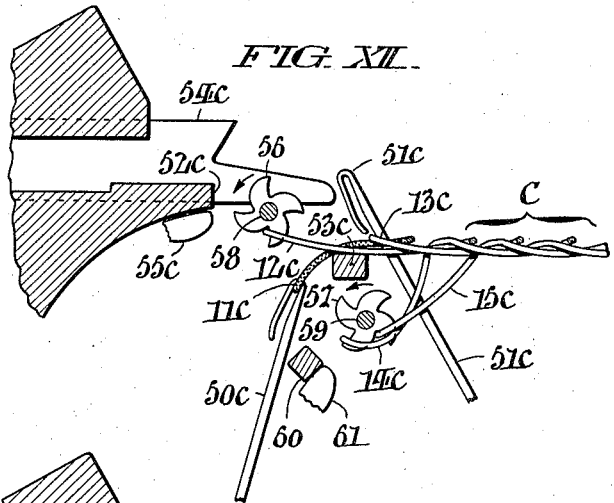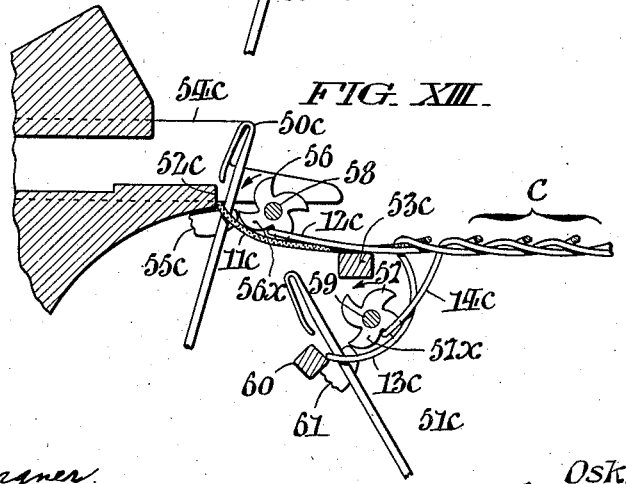

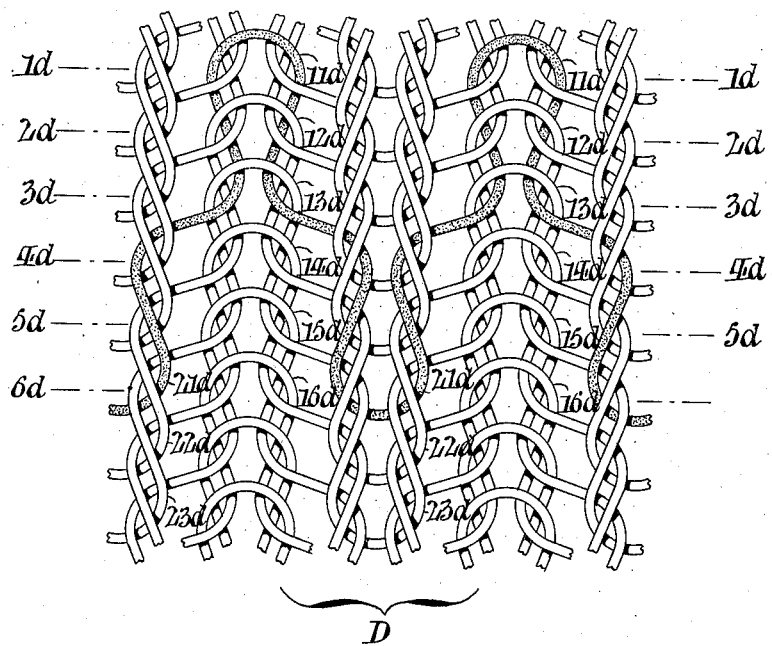

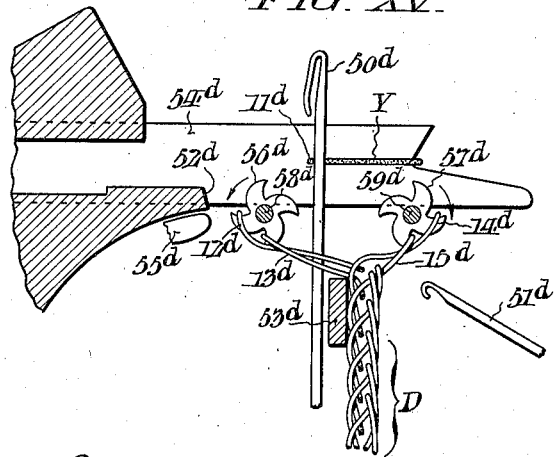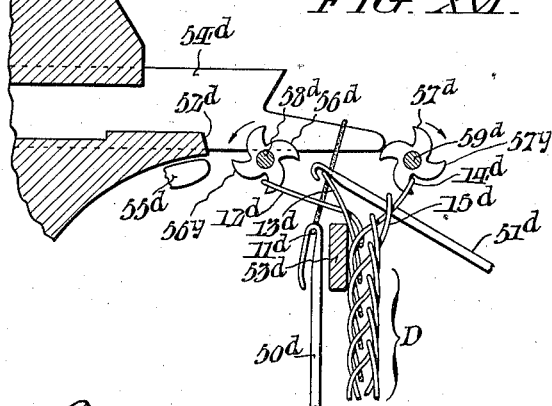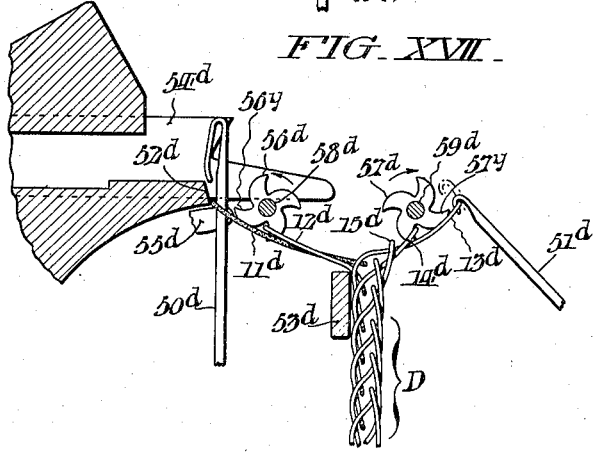

Patented Sept. 6, 1938

2,129,385

UNITED STATES PATENT OFFICE 2,129,385

KNITTING

Oskar Sauer, Philadelphia, Pa.

Application July 8, 1935, Serial No. 30,226

15 Claims. (Cl. 66—169)

This invention relates to knitting. More specifically, it has reference to plain and ribbed fabrics knit from fine count silk, rayon, etc.; as well as to methods of producing such fabrics commercially.

The aim of my invention is to make possible the production from a single thread of fine count, a plain knit sheer fabric for stockings and the like which is of closer texture than possible of attainment heretofore, and which moreover is "ringless" i. e. devoid of horizontal streaks.

The foregoing advantages I realize in practice, as hereinafter more fully disclosed, through a new method of knitting as a result of which the sinker wale loops connecting neighboring needle wale loops of one course of the fabric are consistently transposed to other courses more or less remote from the courses in which said sinker wale loops originated and forming distinct wales of interlooped sinker loops between the needle wales. As a consequence of such consistent transposal of the sinker wale loops, the inequalities inherent in the yarn used in the knitting are effectively distributed throughout the fabric with avoidance of streaks or rings. Further advantages resulting from my new method are that the fabric produced is of a gauge twice as fine as fabric produced in the ordinary way on commercial knitting machines, and characterized by having the loops in alternate wales inverted in respect to the loops of the other wales.

Other objects and attendant advantages will appear from the detailed description which follows of the attached drawings, wherein Fig. I is a diagrammatic view showing the texture of one form of my improved fabric.

Figs. II and III are views similar to Fig. I showing alternative forms of the fabric.

Figs. IV, V, VI and VII are fragmentary perspective views showing how the fabric of Fig. I may be produced on a modified flat knitting machine of the "Cotton" type.

Figs. VIII, IX and X are plan views corresponding to Figs. IV, V and VI.

Figs. VIIIa, IXa and Xa are views like Figs. VIII, IX and X.

Figs. XI, XII and XIII are views like Figs. IV–VII showing how the fabric of Fig. III may be produced commercially.

Fig. XIV shows still another alternative form of fabric generally like the fabric of Fig. III; and Figs. XV, XVI and XVII are views similar to Figs. XI–XIII showing how the fabric of Fig. XIV may be produced commercially.

In order that the construction of the different fabrics may be more easily understood, certain courses have in each instance been distinguished, one from another, by conventional surface shading.

Referring to Fig. I, successive courses of the fabric A there shown are designated by the numerals 1–4. The needle wale loops of the courses 1, 2, 3, and 4 are indicated at 11, 12, 13 and 14 and the sinker wale loops of said courses at 21, 22, 23 and 24. The characterizing features of the fabric A in Fig. I are that the sinker wale loops of each course of the knitting are transposed to adjacent courses; and that said sinker wale loops form inverse loop wales between the needle wale loops at one side of the fabric. Thus the sinker wale loops 21 of the course 1 are interknitted with the needle wale loops 12 of the course 2, the sinker wale loops 22 of the course 2 with the needle wale loops 13 of the course 3, and so on throughout the fabric, the needle and sinker wale loops being however continuous in the needle and sinker wales as in ordinary knitted fabrics.

The fabric A of Fig. I may be produced on a flat knitting machine of the "Cotton" type provided, as shown in Figs. IV–VII, with two sets of needles 50 and 51, a press edge 52 for closing the beards of the needles 50, and a fixed supplemental presser bar 53 for the needles 51, the usual sinkers and knock-overs being shown respectively at 54 and 55. In Fig. IV, the needle 50 is about to descend to draw the loop 11 for the course 1 of the fabric, holding on its shank beneath the sinker 54 the previously-formed loop 12 of the course 2. The needle 51 on the other hand is ascending through the loop 12 of the course 2 and the loop 13 of the course 3 previously cast from the needle 50. The relative positions of the loops 11, 12 and 13 at this stage of the knitting cycle is shown in plan in Fig. VIII. In Fig. V the needle 50 is in its lowered position, and the needle 51 in its raised position. During descent of the needle 50 in Fig. V the loop 11 of the course 1 is engaged within the beard of said needle; while the loop 12 of the course 2 is cast from said needle over the loop 11 by aid of the knockover 55 and falls back upon the raised needle 51. Incidentally it will be noted from Fig. IX that as the loops 12 are cast as just explained they are intertwisted with the loops 11 on the corresponding needles 50 with attendant formation of the completed invert sinker loops 22. In Fig. VI, the needle 50 is ascending, and the needle 51 descending. Incident to its descent in Fig. VI, the needle 51 engages the loop 12 of the course 2 within its hook and draws the same through the loop 11 of the course 1, after which the beard of said needle is depressed by contact with the supplemental presser bar 53. In Fig. VII, the needle 50 is raised to its highest position, and the needle 51 depressed to its lowest position. In moving from the position of Fig. VI to that of Fig. VII, the loop 12 is drawn through the loop 13 of the course 3 of the fabric and said loop 13 is cast from the needle 51 immediately after the closing of the beard of said needle and the descent of the same below the knockover 55, which, by suitable means not illustrated, is positioned below the supplemental presser bar 53 in order to sustain the loop 13 and thereby assist casting thereof. As a consequence of the last described step, the loops 12 are completed in course 2 as shown in Fig. X. In Fig. VII, the needle 50 is ready to receive new yarn Y for the knitting of another course of the fabric, and the needle 51 ready to ascend after the manner described in connection with Fig. IV to repeat the loop forming cycle. From the foregoing it will be seen that a loop is first formed by the needle 50 and thereupon cast from the latter and caught by the needle 51, this operation continuing throughout the knitting of the fabric with the result that the sinker wale loops of the respective courses assume transposed positions in line with the loops of adjacent courses. Any suitable means may be provided for actuating the needles 50 and 51 and the knock-over bits 55 in the manner described. If the machine exemplified be say of thirty-six gauge, (24 needles to the inch) it will be seen from the above procedure that the resultant fabric will be of a gauge double that of the needles, namely, forty eight gauge. The fabric is furthermore characterized by having, at one side thereof, alternate wales (the sinker wales) wherein the loops are inverted in respect to the other (needle) wales. The method of starting this knitting of the fabric is as follows: A starting course, say a course 3 is first formed on the needles 50 as shown in Fig. VIIIa and the sinker wales 23 of such course engaged with the hooks H of a hook bar B as in the starting of any knitting on a flat knitting machine. A second course 2 is then formed as in Fig. IXa and the needle loops 12 drawn through the needle loops 13 of the previous course 3, said loops 13 falling back upon the needles 51. A third course 1 is next formed on the needles 50 as in Fig. Xa with casting of the needle loops 13 of the course 3 from the needles and release of the needle loops 12 of the course 2 to fall back onto the needles 51. This cycle is continuously repeated as described in connection with Figs. VIII–X, the fabric being maintained under constant tension with the result that the needle and sinker wale loops of the successive courses take positions as shown.

In the fabric B of Fig. II, the sinker wale loops 21b corresponding to the needle wale loops 11b of the course 1b are disposed between the needle wale loops 13b of the course 3b; the sinker wale loops 22b corresponding to the needle wale loops 12b of the course 2b between the needle wale loops 14b of the course 4b; and so on throughout the fabric. The fabric B of Fig. II is further characterized by vertical rows of interengaging half loops 31b, 32b and 33b intermediate the needle and sinker wale loops 11b, 12b, 13b and 21b, 22b, 23b. The half loops 31b connecting the needle wale loops 11b and the corresponding sinker wale loops 21b, it will be observed, lie in the intervening course 2b; the half loops 32b connecting the needle wale loops 12b and the corresponding sinker wale loops 22b lie in the intervening course 3b; and so on throughout the fabric. Here again, the alternate wales of the fabric are formed of interlooped sinker loops which are inverted in respect to the loops of the other wales at the same side of the fabric as in Fig. I; with the addition however of lines of half loops between the wales.

A knitting machine arranged as shown in Figs. IV–VII, but with an additional set of needles, that is to say, three sets of needles in all, operated in succession will produce the fabric of Fig. II in the manner similar to that explained in connection with the fabric A featured in Fig. I.

The fabric C illustrated in Fig. III resembles the fabric described and claimed in U. S. Patent No. 1,981,471 in that the corresponding needle wale loops 11c, 13c, 15c, etc. of alternate courses 1c, 3c and 5c engage each other after the manner of plain knitting; and in that the bends or bights of such loops overlie the shanks or sides of corresponding wale loops of alternate intermediate courses 12c, 14c, 16c, etc. likewise interengaged after the manner of plain knitting, with the sides or shank of all the needle wale loops appearing on one face of the fabric, and the bends or bights of all the loops appearing on the other face of the fabric. The fabric C however differs from the patented fabric in that the sinker wale loops 21c–25c, by virtue of being transposed to courses remote from the courses containing the corresponding needle wale loops 11c–15c, form distinct wales between the needle loop wales. The sinker wales of alternate courses, it will be observed, are also engaged with each other after the manner of plain knitting with the bends or bights of said loops overlying the shanks or sides of the corresponding sinker wale loops of alternate intermediate courses, and with the shanks or sides of said sinker wale loops all appearing on one face of the fabric, and the bights or bends of said loops all appearing at the other face of the fabric. In the fabric C, the sinker wale loops are transposed from the corresponding needle wale loops to other courses further remote than in the fabric of Fig. II. Thus, for example, the sinker wale loops 21c corresponding to the needle wale loops 11c of the course 1c lie between the needle wale loops 15c of the course 5c; the sinker wale loops 22c corresponding to the needle wale loops 12c of the course 2c, between the needle wale loops 16c of the course 6c: and so on throughout the fabric.

The fabric of Fig. III may be produced upon a flat knitting machine arranged as shown in Figs. XI–XIII, the machine having two sets of needles 50c and 51c; the usual presser edge 52c for the needles 50c; sinkers 54c; knockovers 55c to coact with the needles 50c. The machine is further provided with toothed loop detaining wheels 56 and 57 in the plane of the needles 50c and 51c, said wheels being mounted on shafts 58 and 59 adapted for intermittent rotation by quarter turns in the direction of the arrows; a supplemental knock-over bar 53c; a supplemental presser edge 60 for the needles 51c; and supplemental knock-overs 61 to coact with the needles 51c. In Fig. XI, the needle 50c is about to descend and in so doing takes a loop 11c for the course 1c of the fabric C just kinked by the sinker 54c. In continuing its descent, the needle carries the loop 11c down through two previously formed intertwisted loops 12c and 13c temporarily held in superimposed relation by the wheel 56, and is in turn intertwisted with the loop 12a in a manner identical with that described in connection with the first embodiment of my invention. When the needle 50c has reached the position shown in Fig. XII, the wheel 56 is turned and releases the loop 13c which falls back upon the needle 51c, which, in the meantime has been raised from the position of Fig. XI to that of Fig. XII and passed upward through two previously formed and intertwisted loops 14c, 15c temporarily held in superposed relation by the wheel 57. In continuing from the position of Fig. XII the needle 50c moves leftward beneath the wheel 56 and then upward between said wheel and the presser edge 52c to the position shown in Fig. XIII. Concurrently, the needle 51c moves downward from the position of Fig. XII to draw the loop 13c through the temporarily previously intertwisted detained loops 14 and 15c and intertwist it with the loop 14c, then leftward beneath the wheel 57, and then upward between said wheel and the supplemental press edge 60 to the position of Fig. XIII when the wheel 57 is actuated to release the loop 15c. In the meanwhile the knock-overs 55c and 61 have been moved forward beneath the loops 11c and 13c as shown in Fig. XIII. The needles 50c and 51c next move downward from the positions shown in Fig. XIII with incidental closing of their beards by the pressed edges 52c and 60 and casting of the loops 11c and 13c which are caught by the vacant teeth 56x and 57x of the wheels 56 and 57. Finally, the needles 50c and 51c move back to the positions shown in Fig. XI to complete the loop forming cycle, which is continuously repeated. The fabric of Fig. III is thus produced under the principle explained in connection with Figs. VIII-X, except for the final casting of the individual needle loops by the detaining wheels which results in the disposal of the sinker wale loops in courses more remote from the courses of origin, and in the interloopment of said sinker wale loops with the sinker wale loops of all the intermediate courses.

The texture of fabric D shown in Fig. XIV is like the fabric shown in Fig. III except in that the sides or shanks of the needle wale loops 11d, etc. and the bights or bends of the sinker wale loops 21d, etc. appear on one face thereof, while the side or shanks of said sinker wale loops and the bights or bends of the needle wale loops appear on the opposite side thereof with consequent presentation of a ribbed effect.

To produce the fabric of Fig. XIV, a knitting machine organized in accordance with Figs. XV-XVII may be used, the same having, in addition to the usual needles 50d, sinkers 54d and knockovers 55d, hooks 51d corresponding in number to the needles 50d, a supplemental knockover bar 53d, and toothed wheels 56d and 57d disposed between neighboring sinkers 54d. As shown, the wheels 56d and 57d are respectively mounted on shafts 58d and 59d, and adapted to be intermittently rotated by quarter turns in opposite directions as indicated by arrows. In Fig. XV, the needle 50d is about to descend, and, in so doing, engages the loop 11d just kinked in the yarn Y by the sinker 54d within its hook. In continuing its descent, the needle 50d draws the loop 11d downward through the two previously formed intertwisted loops 12d and 13d temporarily held by the wheel 56d. As the needle 50d reaches the position of Fig. XVI, the two wheels 56d and 57d are rotated through a quadrant with attendant release of the loops 13d and 15d, the loop 13d falling back against the newly drawn loop 11d and the loop 15d dropping onto the shank of the hook 51d, which, in the meantime, has been advanced through the intertwisted loops 15d, 14d and the loop 11d in readiness to engage the loop 13d. With the foregoing accomplished, the needle 50d moves leftward from the position of Fig. XVI beneath the wheel 56d and then upward between said wheel and the presser edge 52d and lifts the loop 11d to the level of the knockover 55d which advances from the position of Fig. XVI to the position of Fig. XVII to hold said loop. At the same time, the hook 51d is moved rightward beneath the wheel 57d to draw the loop 13d in the opposite direction to which the loop 11d was drawn by the needle 50d through the loops 14d and 15d, and then upward, through the full line position, to the dotted line position in Fig. XVII incident to which said loop 13d is released and caught by the vacant horizontal tooth 57y of the wheel 57d. The loop forming cycle is completed by return of the needle 50d and the hook 51d to the positions of Fig. XV. On its return movement, the needle 50d first descends, then moves rightward beneath the wheel 56d, and finally upward between said wheel and the knockover bar 53d. In moving downward from the position of Fig. XVII as just explained, the beard of the needle 50d is closed by contact with the presser edge 52d for passage through the loop 11d as the needle continues in its descent. Immediately upon being released by the needle 50d, the loop 11d by virtue of the tension thereon is drawn laterally from the knockover 55d and caught by the vacant tooth 56y of the wheel 56d. Any suitable means may be utilized to actuate the hooks 51d and the wheels 56d and 57d in the manner described.

As a consequence of the transposal of said sinker wale loops in all four of the illustrated fabrics, the irregularities inherent in yarns of fine count are effectively distributed, and objectionable "rings" or horizontal streaks thereby precluded in the fabrics. The transposal of the sinker loops in accordance with my invention results as a consequence of impartation to the sinkers of an abnormal movement considerably greater than in a conventional straight knitting machine, as clearly shown in Figs. V, VI, XI and XV. The illustrated fabrics are to be regarded as typical of other possible forms within the scope of the broader of the appended claims.

Having thus described my invention, I claim:

1. A knitted fabric characterized by having plain sinker wale loops of each component course thereof transposed between neighboring plain needle wale loops of a previously knit course.

2. A knitted fabric characterized by having plain sinker wale loops connecting neighboring plain needle wale loops of each component course thereof transposed between corresponding neighboring needle wale loops of a previously knit course.

3. A knitted fabric characterized by having plain sinker wale loops of each component course thereof transposed between plain neighboring needle wale loops of a remote previously knit course, and said sinker wale loops interknit with the needle wale loops of all the intermediate courses.

4. A knitted fabric characterized by having plain sinker wale loops connecting neighboring plain needle wale loops of each component course thereof transposed between corresponding needle wale loops of a remote previously knit course, and said sinker wale loops interknit with corresponding needle wale loops of all the intervening courses.

5. A knitted fabric characterized by having the needle wale loops of alternate courses engaged with each other after the manner of plain knitting and said loops interknitted with the needle wale loops of alternate intermediate courses likewise interengaged after the manner of plain knitting; and further characterized by having the sinker wale loops of each component course transposed between neighboring needle wale loops of another course.

6. A knitted fabric characterized by having corresponding needle wale loops of alternate courses engaged with each other after the manner of plain knitting, and said loops interknitted with corresponding needle wale loops of alternate intermediate courses likewise engaged with each other after the manner of plain knitting; and further characterized by having the sinker wale loops of each component course transposed between neighboring needle wale loops of another course.

7. A knitted fabric characterized by having the needle wale loops of alternate courses engaged with each other after the manner of plain knitting, and the bends or bights of such loops overlying the shanks or the sides of the needle wale loops of alternate intermediate courses likewise interengaged after the manner of plain knitting; and further characterized by having the sinker wale loops of each component course transposed between neighboring needle wale loops of another course.

8. A knitted fabric characterized by having corresponding needle wale loops of alternate courses engaged with each other after the manner of plain knitting, and the bends or bights of such loops overlying the shanks or sides of corresponding needle wale loops of alternate intermediate courses likewise engaged after the manner of plain knitting; and further characterized by having the sinker wale loops of each component course transposed between neighboring needle wale loops of another course.

9. A knitted fabric characterized by having the needle wale loops of alternate courses engaged with each other after the manner of plain knitting and said loops interknitted with the needle wale loops of alternate intermediate courses likewise interengaged after the manner of plain knitting, the sides or shanks of all the loops appearing at one side of the fabric and the bends or bights of all the loops appearing at the opposite side of the fabric; and further characterized by having the sinker wale loops of each component course transposed between neighboring needle wale loops of another course.

10. A knitted fabric characterized by having corresponding needle wale loops of alternate courses engaged with each other after the manner of plain knitting, and said loops interknitted with corresponding needle wale loops of alternate intermediate courses likewise engaged with each other after the manner of plain knitting, the sides or shanks of all the loops appearing at one side of the fabric and the bends or bights of all the loops appearing at the other side of the fabric; and further characterized by having the sinker wale loops of each component course transposed between neighboring needle wale loops of another course.

11. A knitted fabric characterized by having the needle wale loops of alternate courses engaged with each other after the manner of plain knitting, and the bends or bights of such loops overlying the shanks of the sides of the needle wale loops of alternate intermediate courses likewise interengaged after the manner of plain knitting, the sides or shanks of all the loops appearing at one side of the fabric, and the bends or bights of all of the loops appearing at the other side of the fabric; and further characterized by having the sinker wale loops of each component course transposed between neighboring needle wale loops of another course.

12. A knitted fabric characterized by having corresponding needle wale loops of alternate courses engaged with each other after the manner of plain knitting, and the bends or bights of such loops overlying the shanks or sides of corresponding needle wale loops of alternate intermediate courses likewise engaged after the manner of plain knitting, the sides or shanks of all the loops appearing at the front of the fabric, and the bends or bights of all the loops appearing at the back of the fabric; and further characterized by having the sinker wale loops of each component course transposed between neighboring needle wale loops of another course.

13. The method of knitting by repetitions of a cycle which comprises drawing a new course of loops through loops of one of a number of previously formed held courses; and drawing the loops of one of the held courses through loops of another held course with incidental casting of the latter course.

14. The method of knitting by repetitions of a cycle which comprises drawing loops of a new course through corresponding loops of a previously-formed held course; drawing the loops of the held course through the corresponding loops of a previously-formed second held course; and then drawing the loops of the second held course through corresponding loops of a third previously formed held course with incidental casting of the latter course.

15. The method of knitting by repetitions of a cycle which comprises drawing a new course of loops through a pair of previously-formed held courses while casting one of said held courses; and drawing the cast held course through another pair of previously-formed held courses while casting one of the last mentioned pair of held courses.

OSKAR SAUER.